US006216406B1

(12) United States Patent
Hauser

(10) Patent No.: US 6,216,406 B1
(45) Date of Patent: *Apr. 17, 2001

(54) BASEBOARD INFRASTRUCTURE SYSTEM

(76) Inventor: Herb Hauser, 301 W. 53$^{rd}$ St., New York, NY (US) 10019

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/871,423

(22) Filed: Jun. 9, 1997

(51) Int. Cl.$^7$ ................................ H02G 3/04; E04F 19/04
(52) U.S. Cl. ...................... 52/287.1; 52/220.1; 52/716.1; 174/48; 174/49; 174/101
(58) Field of Search ................................ 52/287.1, 288.1, 52/716.1, 220.1, 220.7; 174/48, 49, 50, 101; 239/209, 216, 113, 114, 135, 136, 142, 49, 535, 211; 220/3.2, 3.3, 3.7, 3.8

(56) References Cited

U.S. PATENT DOCUMENTS

| 628,696 | * | 7/1899 | Chase et al. ........................ 174/101 |
| 1,226,813 | | 5/1917 | Rowntree . |
| 1,350,658 | * | 8/1920 | Lawrence ............................ 174/48 |
| 1,588,183 | * | 6/1926 | Goddard ............................. 439/142 |
| 1,755,545 | * | 4/1930 | Lacey ............................. 174/48 X |
| 1,809,223 | * | 6/1931 | Tashjian ........................... 52/288.1 |
| 1,857,378 | | 5/1932 | Hubbell, Jr. . |
| 1,898,526 | | 2/1933 | Dwyer . |
| 2,484,992 | | 10/1949 | Ginther . |
| 2,647,242 | * | 7/1953 | Kutcka ............................ 52/287.1 |

(List continued on next page.)

FOREIGN PATENT DOCUMENTS

| 190929 | * | 8/1937 | (CH) | ................................ 52/288.1 |
| 449739 | * | 4/1968 | (CH) | .................................... 174/48 |
| 594794 | * | 1/1978 | (CH) | ................................ 52/288.1 |
| 2410389 | * | 9/1975 | (DE) | .................................... 174/101 |
| 2415768 | * | 10/1975 | (DE) | .................................... 174/48 |
| 0627802 | | 12/1994 | (EP) . | |
| 744138 | * | 4/1933 | (FR) | ................................ 52/287.1 |
| 1267915 | * | 6/1991 | (FR) | .................................... 174/48 |
| 1466160 | | 3/1977 | (GB) . | |
| 1500561 | * | 8/1978 | (GB) | .................................... 174/101 |
| 2254966 | * | 10/1992 | (GB) | .................................... 174/48 |

OTHER PUBLICATIONS

International Search Report PCT/US98/11786 (Sep. 18, 1998).

*Primary Examiner*—Laura A. Callo
(74) *Attorney, Agent, or Firm*—R. Lewis Gable; Cowan, Liebowitz & Latman, PC

(57) ABSTRACT

A baseboard infrastructure system is described having baseboard members and premise hubs. The baseboard member is formed to conceal and protect cables or wires installed within a channel region formed between the baseboard and a wall the baseboard is mounted against. The baseboard member has an integrated connector assembly ICA for connection of external wires and cables with the wires and cables contained within the channel region of the baseboard member. An ICA having an ICA plate with jacks or connectors mounted thereon is formed to allow vertical connection of wires or cables. An ICA cap formed to match the shape of the top of the baseboard mounts in the ICA when the ICA is not used for connection of cables or wires. Multiple baseboard members are mounted within a room or rooms to a building, thereby concealing the wiring of the room and providing ICAs for connection of wires and cables. Wires and cables within the channel region of the baseboard members connect with telephone, cable, power and information lines coming into the apartment or building at a premise hub. The premise hub is configured to split incoming lines depending on the needs of the occupants of the apartment or space of the building.

15 Claims, 11 Drawing Sheets

U.S. PATENT DOCUMENTS

| | | | |
|---|---|---|---|
| 2,680,775 | * | 6/1954 | Wiesmann ........................ 174/101 X |
| 3,240,456 | * | 3/1966 | Hartman ............................. 174/48 X |
| 3,262,083 | * | 7/1966 | Gooding ............................. 174/48 X |
| 3,298,147 | | 1/1967 | Haberman . |
| 3,461,220 | | 8/1969 | Hukin . |
| 3,546,360 | | 12/1970 | Bailey . |
| 3,676,974 | | 7/1972 | Daly . |
| 3,773,969 | * | 11/1973 | Geisel .................................... 174/67 |
| 3,821,688 | | 6/1974 | Larsile . |
| 3,873,758 | * | 3/1975 | VanGessel et al. .................... 174/48 |
| 4,252,989 | | 2/1981 | Blumenthal . |
| 4,778,399 | * | 10/1988 | Schenk ............................. 174/48 X |
| 4,883,924 | * | 11/1989 | Hadfield ................................. 174/48 |
| 4,950,839 | * | 8/1990 | Quinn et al. ........................... 174/48 |
| 4,984,982 | | 1/1991 | Brownlie et al. . |
| 5,053,637 | | 10/1991 | Dillard . |
| 5,126,509 | * | 6/1992 | Yen ........................................ 174/48 |
| 5,183,406 | * | 2/1993 | Glen .................................... 439/120 |
| 5,326,931 | * | 7/1994 | Cain et al. ............................. 174/48 |
| 5,473,717 | | 12/1995 | Baptiste et al. . |
| 5,704,175 | * | 1/1998 | Lewis ............................. 52/287.1 X |
| 5,721,394 | * | 2/1998 | Mulks .................................... 174/48 |
| 5,753,855 | * | 5/1998 | Nicoli et al. .................... 52/287.1 X |
| 6,021,619 | * | 2/2000 | Mansson ............................. 52/716.1 |

* cited by examiner

BASEBOARD INFRASTRUCTURE SYSTEM

BACKGROUND

1. Field of the Invention

The present invention relates to the field of infrastructure systems in general. More particularly, the present invention relates to the field of electrical and communications infrastructure routing within a permanent or temporary home, building, or facility.

2. Description of the Related Art

A major factor in the occupation of any commercial or residential space is the routing of AC power and communications lines. Without power for computers, lamps, facsimile machines, copiers, printers and other devices, most modern workspaces simply cannot be occupied. With the growth in information technology, the same has become true for access to communication lines. In all types of work environments, from offices to manufacturing facilities, information and the ability to share information has become central to the operations of many employees. Workers in offices and production facilities need access to information relating to customers, inventory, design plans, and scheduling to name just a few. While access to information has significantly aided workers in performing their jobs, competition has made providing such access an essential for firms wishing to be competitive in the marketplace of the 21st century. Firms wishing to occupy new office space or manufacturing facilities are faced with substantial costs in routing power and communication lines with currently available infrastructure systems.

With the advent of information entertainment such as cable TV, DSS dishes, internet hookups and on-line services, there is an increasing need to run multiple power, video, voice, data and other communication lines within the home. This trend is increasing as workers, with the advent of computer networks, face the option of tele-commuting or working late on a home computer by accessing data from computers at work or elsewhere. Home connectivity to communication and information networks is an important feature in a residential space directly effecting the quality of life of the resident.

The standard wall jack used in most homes and offices has substantial limitations which increase the cost of rerouting an office space. As office partitions change, relocating outlets is an expensive, labor intensive proposition. Each outlet needs to be rerouted though the wall to its new location. Additionally, even when installed, the wires and cables plugged into the jack protrude perpendicularly from the wall. This makes them prone to damage from shifting furniture or from traffic within the space. Furniture placed in the office must be positioned several inches away from the wall to give adequate space for the protruding wires and cables. Pushing furniture too close to the wall can bend or damage the connectors on the jack. In the event that placement of computer equipment within a space is changed from the original conception, or new equipment is added, the cost and interruption associated with installing new outlets often results in the hazard of running extension cables along walls and across floors.

Another attempt at retrofitting an existing space with power and communication lines is shown in FIG. 1. Instead of installing outlets within the walls, as described above, existing space is retrofitted with power and communication cables with a surface mount jack (2). The jack (2) protrudes perpendicularly to the wall and actually protrudes further from the wall than the standard wall jack. Unlike the standard wall jack, the surface mounted wall jack runs the power and communication cables inside a conduit (4) attached to the wall. In addition to the disadvantages described above for wires and cables protruding perpendicular to the wall, the surface mounting of the conduit (4) departs from the clean lines often associated with modern architectural style.

Another current attempt to provide power and communication lines to workstations are floor mounted jack systems. While floor mounted jack systems do not have connectors protruding from the wall, they have other significant disadvantages. One disadvantage is the difficulty in relocating floor jacks in standard flooring. As with the standard wall mounted jack, floor jacks must be routed through to fixed jacks that cannot easily be relocated. In the standard flooring of existing office buildings or homes, a hole in the floor must be drilled or cut to allow routing of the cables and installation of the jack. This makes relocating jacks prohibitively expensive. While artificial flooring exists, which can be mounted above existing flooring for jack installation and cable routing, this is very expensive and not well suited to home use.

Accordingly, it is desired that the present invention overcome the limitations of current infrastructure systems and equipment.

SUMMARY OF THE INVENTION

The present invention provides a baseboard infrastructure system that is easily adapted to existing structures. Power cables and communication lines are contained within the baseboard members, thereby eliminating the need for routing within walls or under flooring. Jacks for power and communication lines are provided on the upper surface of the baseboard in an integrated connector assembly (hereinafter ICA). This allows cables connected to the jack to protrude parallel to the wall, thereby averting interfering with furniture placement and protecting the cables from damage.

In one embodiment of the present invention, a ICA cap is provided which snaps into the baseboard at the location of the upwardly facing jack. When a jack is not being used for connection to power or communication lines, the ICA cap provides a smooth aesthetic appearance to the baseboard. Additionally, the ICA cap protects jacks and connectors within the upwardly facing jack from dust or debris.

In another embodiment of the present invention, the ICA cap is actually a sliding cover which exposes the jacks for connection of cables and slides closed to protect the jacks when not in use. The sliding cover is incorporated into the top of the baseboard and slides in a horizontal direction to expose or protect the jacks located within a recessed panel within the baseboard.

DETAILED DESCRIPTION OF THE INVENTION

The present invention provides a baseboard infrastructure system. In the following description, numerous details are set forth in order to enable a thorough understanding of the present invention. However, it will be understood by those of ordinary skill in the art that these specific details are not required in order to practice the invention. Further, well-known elements, devices, process steps and the like are not set forth in detail in order to avoid obscuring the present invention.

In the following figures like objects are given the same numbers in an effort to aid the reader in understanding the features of the present invention.

Figure 1:
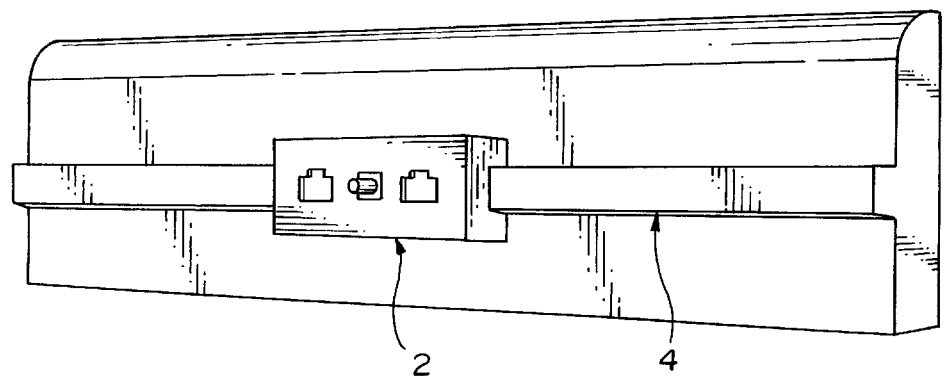
FIG. 1 is a perspective view of a surface mounted wall jack of the prior art.
Figure 2:
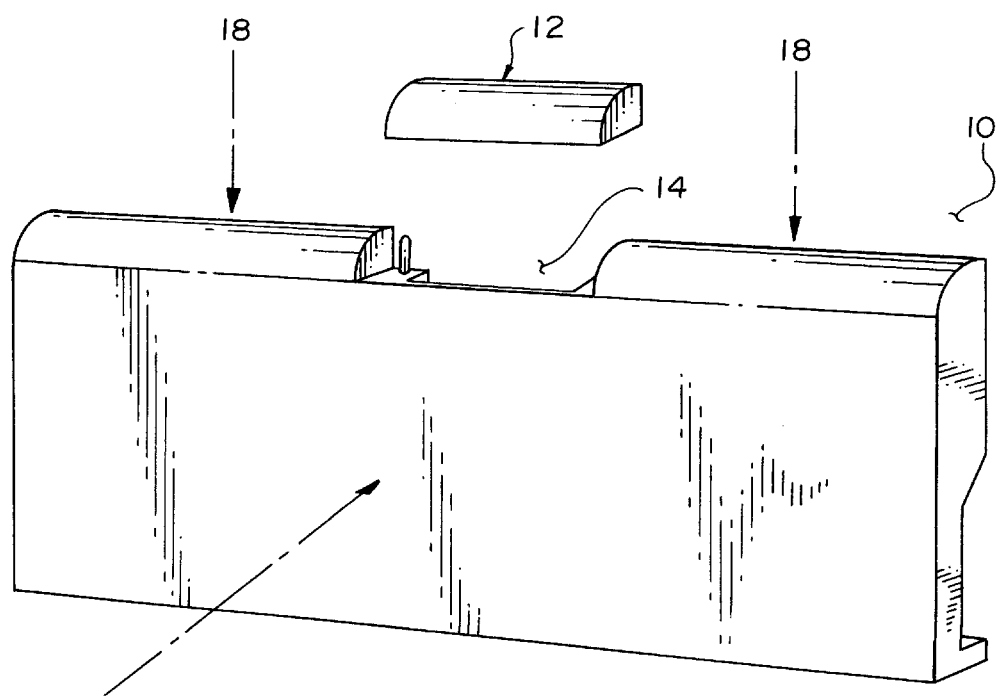
FIG. 2 is a front perspective view of a baseboard member with an ICA cap removed to reveal the upwardly facing jacks in accordance with the present invention.

FIG. 2 is a front perspective view of a baseboard member (10) with an ICA cap (12) removed to allow access to an integrated connector assembly (14) (hereinafter ICA). A front surface (16) of the baseboard member (10) has a flat surface. An upper surface (18) of the baseboard member (10) is formed with a curved or molded surface in an aesthetically pleasing manner.

Figure 3:
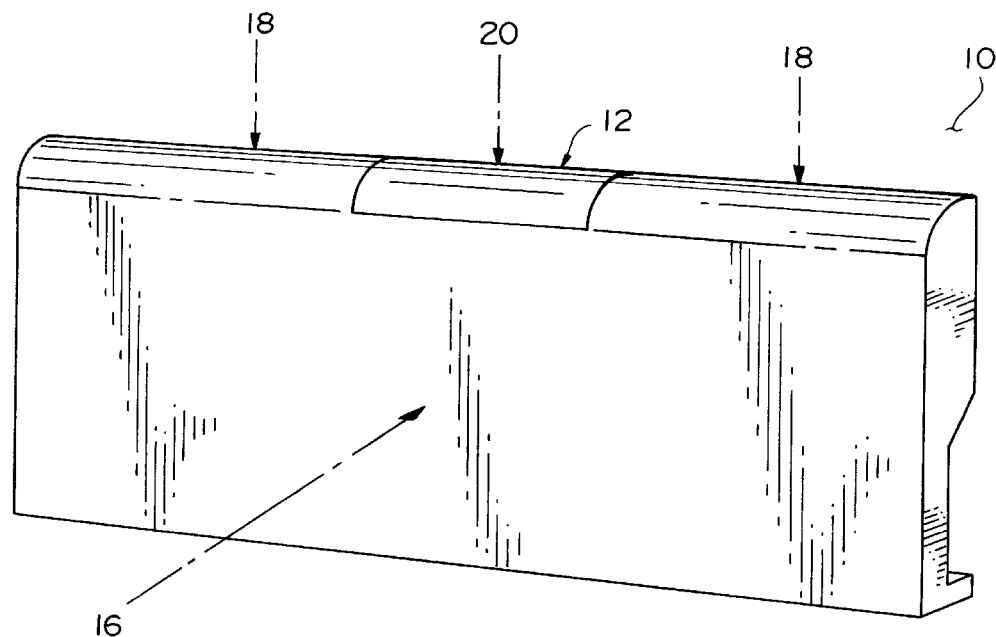
FIG. 3 is a front perspective view of a baseboard member as shown in FIG. 2 with the ICA cap installed in accordance with the present invention.

FIG. 3 shows the baseboard member (10) with the ICA cap (12) installed. An upper surface (20) of the ICA cap (12) is formed to match the upper surface (18) of the baseboard member (10). When the ICA (12) cap is installed, the baseboard member (10) has the appearance of a standard baseboard used in homes and offices.

Figure 4:
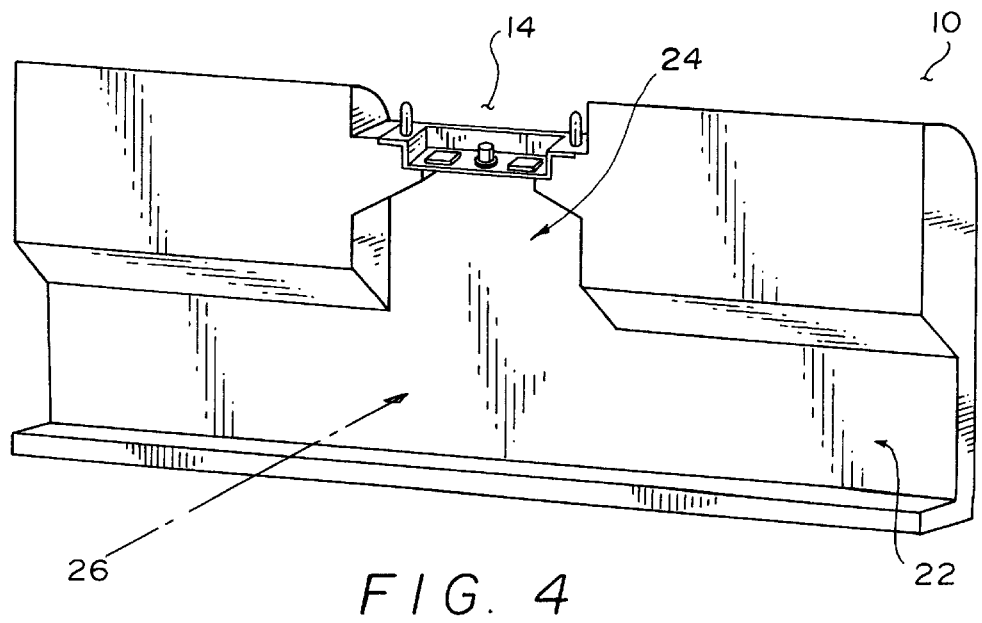
FIG. 4 is a rear perspective view of a baseboard member as shown in FIG. 2 with the ICA cap removed in accordance with the present invention.

FIG. 4 is a rear perspective view of the baseboard member (10) showing the ICA (14) and a channel region (22) of the baseboard member (10). The ICA cap (not shown) has been removed from the ICA (14). A connector region (24) is formed below the ICA (14) to prevent interference between jacks mounted within the ICA (14) and cables within the channel region (22). As will be described in greater detail later, the baseboard member (10) is formed such that when a rear surface (26) of the baseboard member (10) is placed against a wall (not shown), a channel for carrying cables is formed from the channel region (22) and the wall. In this manner the power and communication cables are concealed from view and protected by the baseboard member (10).

Figure 5:
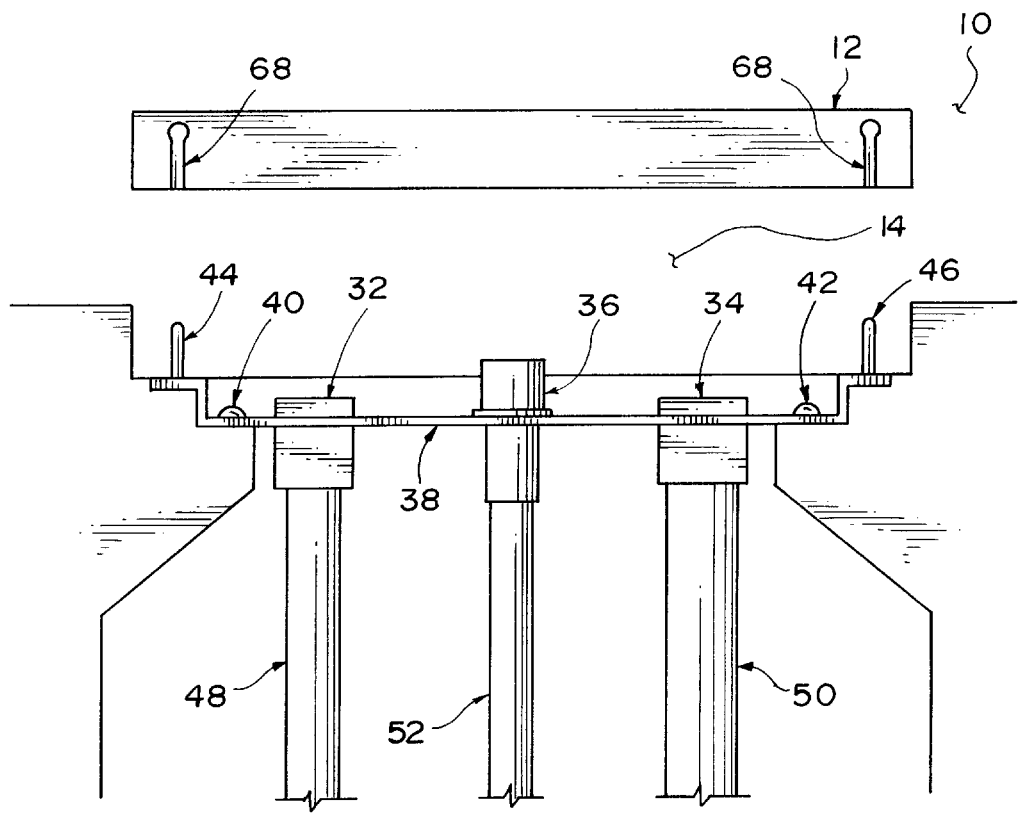
FIG. 5 is a close up rear view of the ICA in accordance with the present invention.

FIG. 5 is a view of the ICA (14) of the baseboard member (10). The ICA (14) includes two RJ45 connectors (32) and (34) and one coaxial cable connector (36). RJ45 connectors (32) and (34) allow connection of video, data or telephone lines. The connectors (32), (34) and (36) are affixed to an ICA plate (38) by two ICA plate retaining screws (40) and (42). The ICA plate (38) is mounted within the ICA (14) is such manner that cables plugged into to the connectors (32), (34) and (36) protrude perpendicular to the ICA plate (38). Two cap retaining pins (44) and (46) protrude from the ICA plate (38) of the ICA (14). The cap retaining pins (44) and (46) are used to secure a ICA cap (12) in place when connectors (32), (34) and (36) are not being used. Telephone and data cables (48) and (50) are connected to each of the RJ45 connectors (32) and (34), respectively. An AV coaxial cable (52) is connected to a coaxial connector (36) which is installed in the ICA (14). The telephone cables (48) and (50) and the coaxial cable (52) are run down the channel region (not shown) in the baseboard member (10) when installed.

Figure 6:
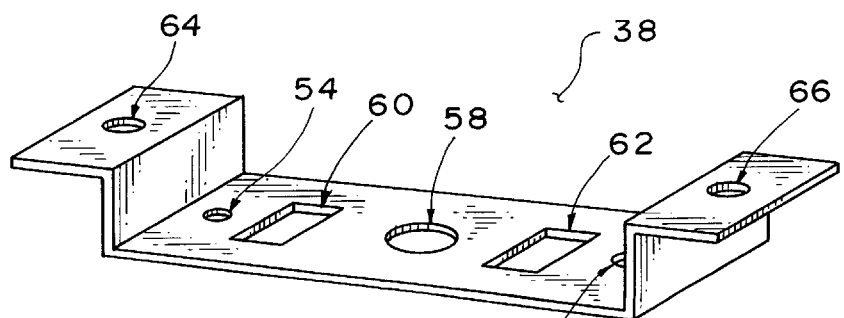
FIG. 6 is a perspective view of an ICA plate in accordance with the present invention.
Figure 7:
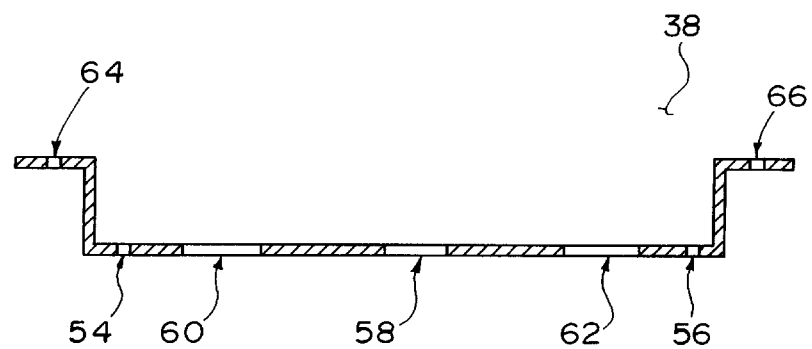
FIG. 7 is a cross sectional view of the ICA plate shown in FIG. 5 in accordance with the present invention.

FIG. 6 is a perspective view of the ICA plate (38). The ICA plate (38) is formed from any stiff material such as a plastic or metal. FIG. 7 is a side, cross sectional view of the ICA plate (38) shown in FIG. 6 taken about the center of the long axis of the ICA plate (38). Holes (54)–(66) in the ICA plate (38) are formed during molding, in the case of the ICA plate (38) plate formed from plastic, or by cutting or drilling. Holes (54) and (56) are for the ICA plate retention screws (40) and (42) as shown in FIG. 5. Hole (58) is circular and is formed to allow mounting of the coaxial connector (36). Holes (60) and (62) are square and formed to allow mounting of a telephone line connectors (32) and (34) as shown in FIG. 5. Holes (64) and (66) are formed to allow mounting of retention pins (44) and (46) as shown in FIG. 5. The retention pins (44) and (46) can be press fit within the holes (64) and (66). Another possible means of securing the retention pins (44) and (46) within the holes (64) and (66) of the ICA plate (38) is by a mounting screw (not shown) which screws into the retention pin from the side of the ICA plate (38) opposite the side on which the retention pin is mounted. Alternatively, when the ICA plate (38) is formed from a molding process, the retention pins (44) and (46) can be integrally molded as part of the ICA plate (38).

The ICA cap (12) shown in FIGS. 2–3 and 5 has two ICA cap retention channels (68) positioned to allow the ICA cap (12) to be securely held in place. The ICA cap retention channels (68) and cap cover retention pins (44) and (46) are formed to provide sufficient friction to securely hold the cap cover (12) on the baseboard member (10) when installed. The cap cover (12) is removed from the baseboard member (10) by prying with a screwdriver or like instrument.

Figure 8:
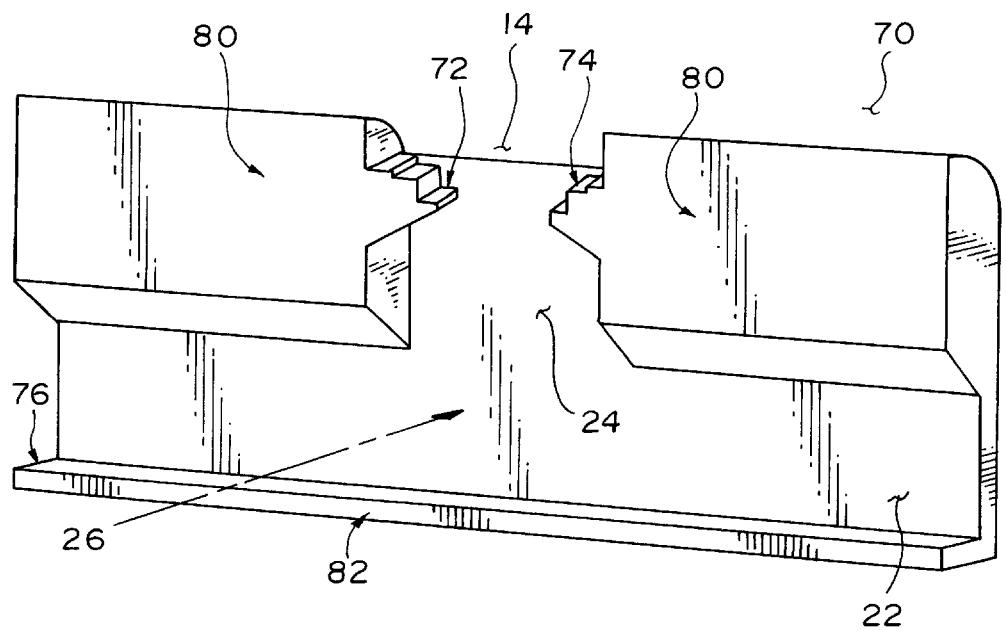
FIG. 8 is a rear perspective view of a baseboard member stock as shown in FIG. 3 without the ICA plate installed in accordance with the present invention.
Figure 9:
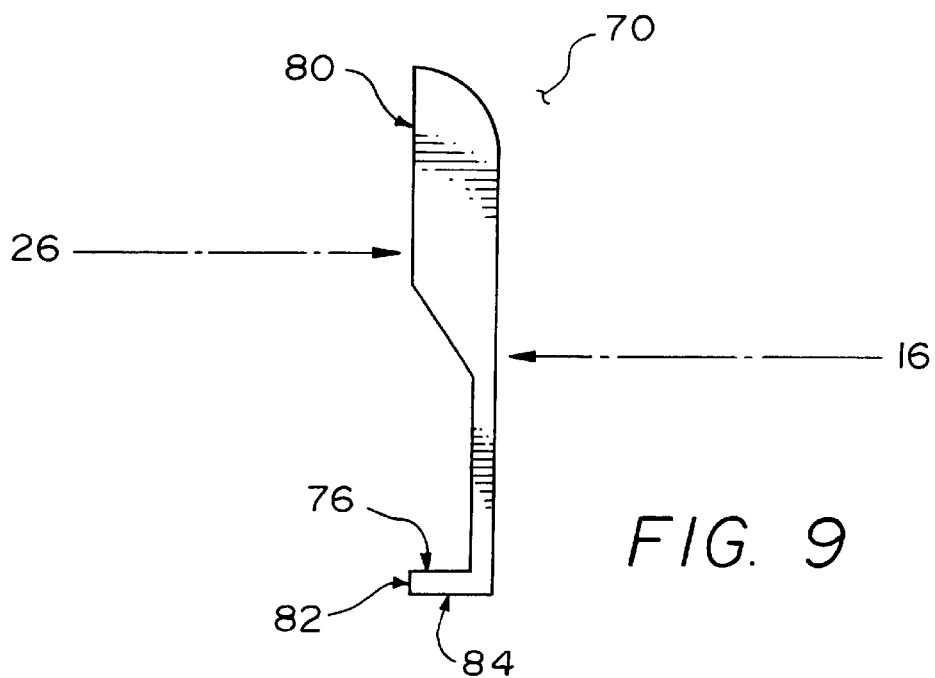
FIG. 9 is an end view of the baseboard member stock shown in FIG. 8 in accordance with the present invention.

FIG. 8 is a rear perspective view of a baseboard member stock (70) as shown in FIG. 3 without the ICA plate or jacks installed. FIG. 9 is an end view of the baseboard member stock (70) shown in FIG. 8. The baseboard member stock (70) is 4 ft. long, 6 inches high and 2.25 inches deep. The baseboard member stock (70) is formed from a stiff material, such as wood or plastic. The baseboard member stock (70) can either be molded or machined in the configuration shown. The ICA (14) is formed to accept the ICA plate (38), as shown in FIGS. 6 and 7. The ICA plate (38) screws to, and is supported by, the ICA plate supports (72) and (74). The ICA cap (12), as shown in FIG. 5, is formed to fit the ICA (14). The channel region (22) is formed along the long axis of the baseboard member stock member stock (70) to allow cables and/or wires (not shown) to be run between on which the baseboard (70) and a wall (not shown) the baseboard is mounted against. The channel region (22) extends 1.5 inches deep into the baseboard member stock (70) from the back side (26) of the baseboard member stock (70). The back surfaces (80) and (82) contact a wall (not shown) when the baseboard is installed. The channel region (22) extends 2.5 inches above a lower lip (76). The lower lip (76) of the baseboard member stock (70) extends from the front (16) to the rear surface (26) of the baseboard member stock (70), contacting a wall when installed. The channel region (22) extends a uniform height above the bottom surface (84) of the baseboard along the length of the baseboard member stock (70). This allows multiple baseboard sections to be connected to span a room, thereby allowing wires and cables to run from channel region to channel region of adjoining baseboards. These dimensions of the channel region (22) allow several cables, wires, cords or lines to run within the channel region when the baseboard member stock (70) is installed against a wall.

Figure 10:
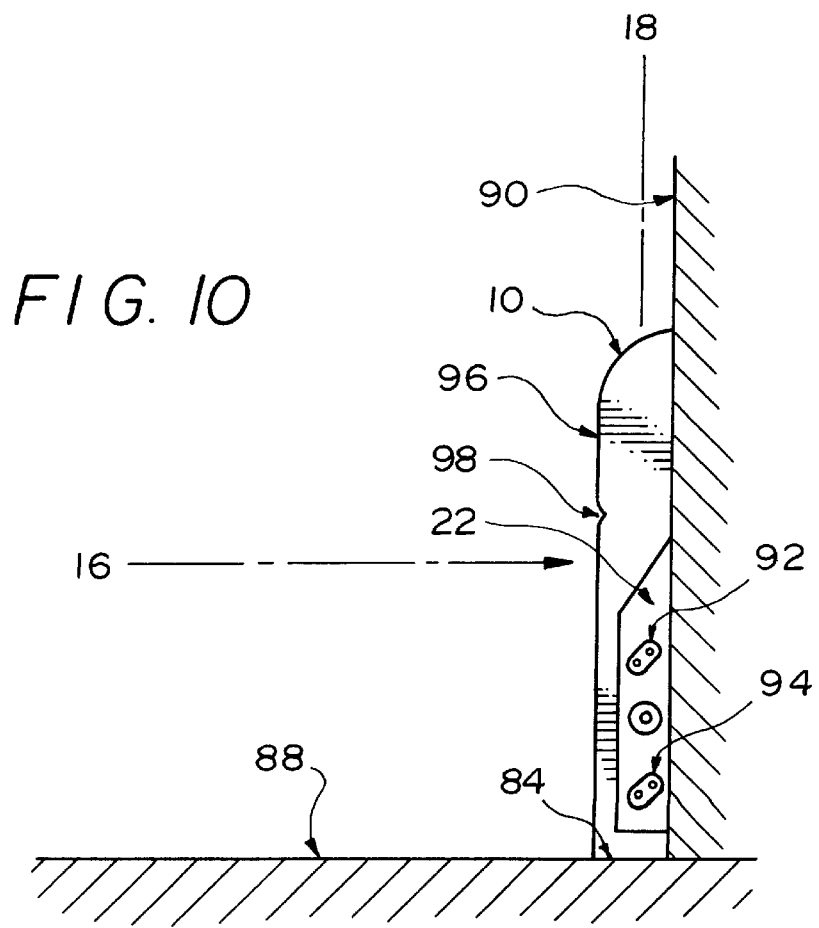
FIG. 10 is an end view of the baseboard member installed against a wall of a building in accordance with the present invention.

FIG. 10 shows a cross-sectional view of a baseboard member (10) installed against a wall (90) within a room of a building or structure. The bottom surface (84) of the baseboard member (10) rests on the floor (88). The back surfaces (80) and (82) of the baseboard member (10) fits against the wall (90) such that the channel region (22) is separated and enclosed from the room by the baseboard member (10) and the wall (90). Within the channel region (22), telephone lines (92) and (94) and coaxial cable are run to the ICA (not shown).

The baseboard member (10) can be secured to the wall (10) by nailing or screwing through a nailing runner (96) of the baseboard member (10). The nailing runner (96) is the portion of the baseboard extending from the front (16) to the rear (26) of the baseboard and above the channel region (22). In the embodiment of the baseboard member (10) shown in FIG. 10 having a height of 6 inches, the nailing runner (96) extends from the top (18) of the baseboard member (10) down 3 inches to a nail indicator groove (98) in FIG. 10. The nailing runner (96) extends along the length of the baseboard member (10) but does not extend in the region of the baseboard below the ICA cap (12) and the ICA (14), as shown in FIGS. 2–3. The ICA (14) and the connector region (24), as shown in FIG. 10, extend beneath the ICA cap (12) as shown in FIGS. 2–3. As such, nailing in the ICA (14) and the connector region (24) is likely to damage wires or cables within these regions of the baseboard member (10). Nails or screws can be put through the upper 3 inches of the baseboard member (10) except in the region immediately beneath the ICA cap (12). In this manner the baseboard member (10) can be installed within a room of a building by nailing or screwing without danger of damaging the wires or cables.

Alternatively, the baseboard member (10) can be installed by an epoxy, glue or adhesive between the baseboard member (10) and the wall (90). In such an installation, epoxy is placed on the rear surfaces (80) and (82) of the baseboard which contact the wall (90), as shown in FIG. 8. Care should be taken to avoid epoxy from entering the channel region (22), or the ICA (14) and connector region (not shown), and thereby interfering with wires and cables.

Figure 11:
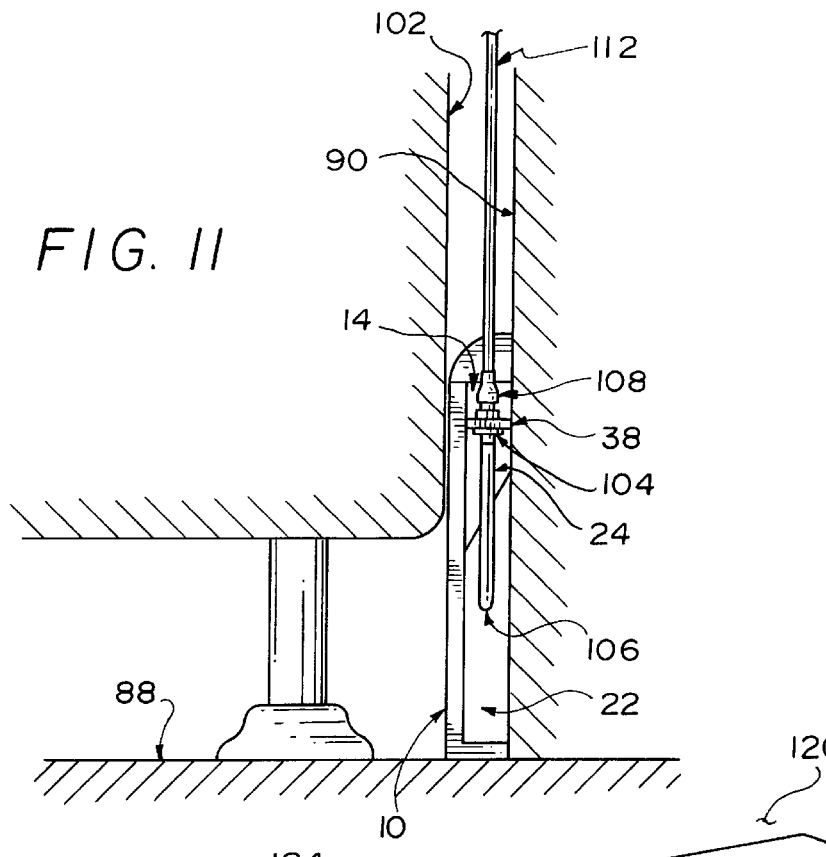
FIG. 11 is a cross sectional view of the baseboard member and ICA installed against a wall in a room in accordance with the present invention.

FIG. 11 shows a cross-sectional view taken through the ICA (14) of the baseboard member (10) installed against the wall (90) within a room of a building or other structure. A piece of furniture (102) such as a desk, bookcase or dresser is located within the room adjacent the baseboard member (10) and parallel to the wall (90). Installed within the ICA (14) is a connector (104) with a AV coaxial cable (106) mounted to the connector (104). The AV coaxial cable (106) is located within the connector region (24) beneath the ICA (14) and extends down the channel region (22). A coaxial cable (112) having a connector (108) is connected to the AV connector (104). The cable (112) and connector (108) mount perpendicularly to the ICA plate (38) and parallel to the wall (90). This allows the piece of furniture (102) to be pushed up against the baseboard member (10) without interfering with or damaging the cable (112), or connectors (108) or (104), or the ICA plate (38). The AV coaxial cable (106) is used in FIG. 11 and the accompanying description as an example to illustrate the features of the invention. Other embodiments could utilize telephone lines, data transmission lines, fiber optic cables, AC power cables, or other cables or wires connected in any combination to connectors mounted within the jack region.

Figure 12:
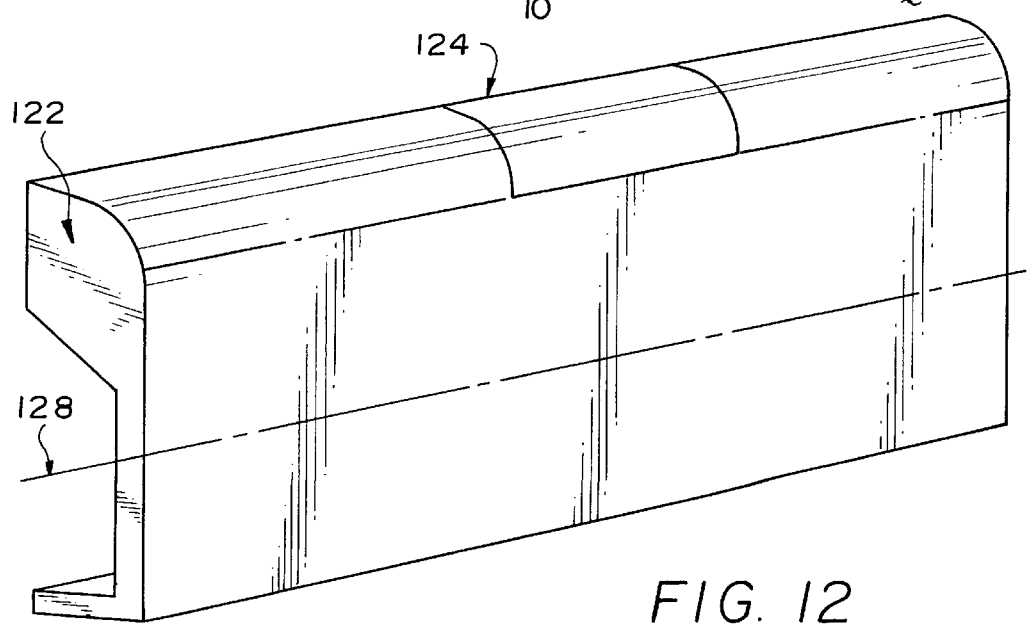
FIG. 12 is perspective view of the baseboard member mitered on one end at an angle of 45° in accordance with the present invention.
Figure 13:
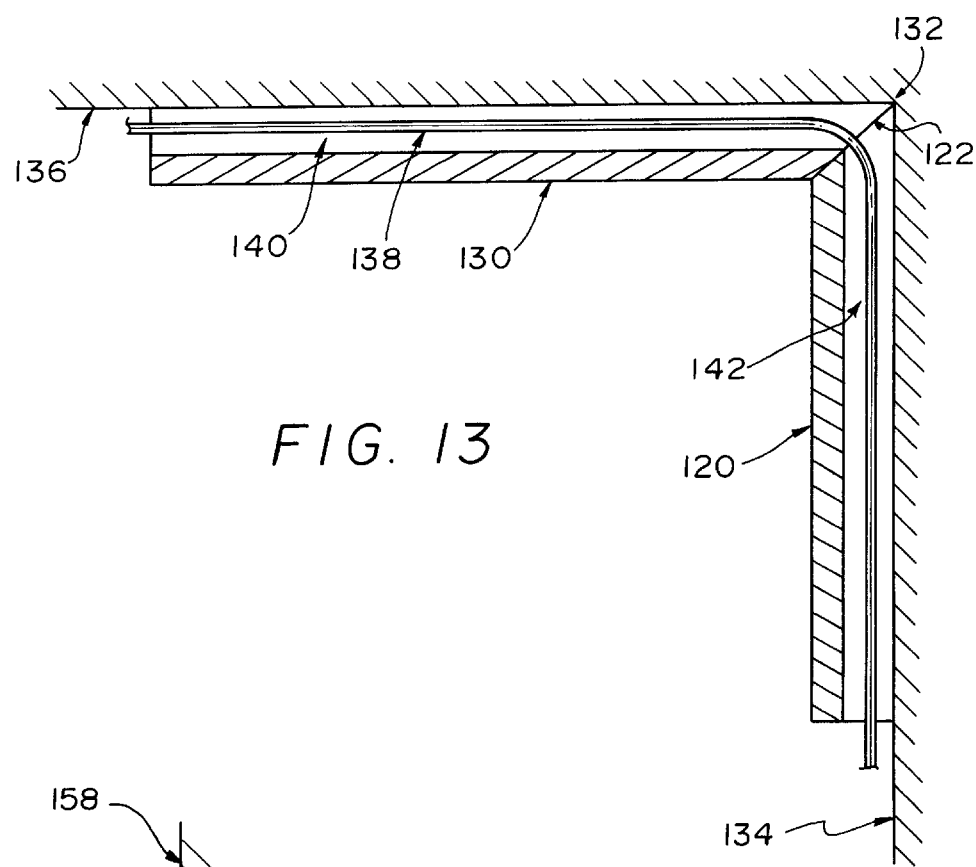
FIG. 13 is a top cross sectional view of the mitered baseboard member shown in FIG. 12 joined with a baseboard member having a complimentary miter and installed against a wall of a building, in accordance with the present invention.

FIG. 12 shows a baseboard member (120) as shown in FIGS. 2–3 having one end (122) of the baseboard mitered at a 45° angle. An ICA cap (124) is installed in the baseboard (120) and conceals the ICA (not shown). FIG. 13 is a top cross sectional view showing two baseboards (120) and (130) having complimentary miters and joined in the corner (132) of a room. The cross section is taken about the lengthwise axis (128) of the baseboard member (120) shown in FIG. 12. Baseboard member (120) is mounted against a wall (134) and baseboard member (130) is mounted against a wall (136). A cable (138) runs within the channel region (140) of baseboard member (130) to the channel region (142) of baseboard member (120). In this manner a cable or cables is able to be run along the wall of a room by connecting several baseboards such that their channel regions (142) link up to form one continuous channel region.

Figure 14:
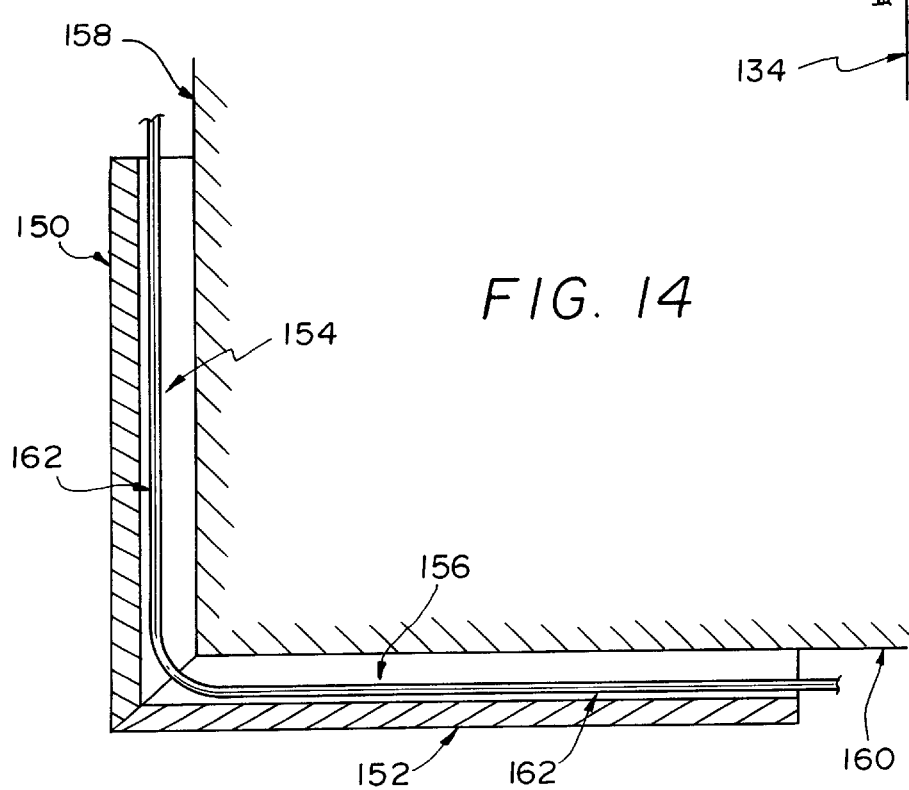
FIG. 14 is a top cross sectional view of two complimentary mitered baseboard members joined together and installed against a wall of the building, in accordance with the present invention.

FIG. 14 is a cross sectional view which shows another embodiment of the present invention where two baseboards (150) and (152) have complimentary miters on one end are joined at a corner of a room to form a continuous channel region from their respective channel regions (154) and (156). Baseboard member (150) has a channel region (154) and baseboard member (152) has a channel region (156). Baseboard member (150) is mounted against a wall (158) and baseboard member (152) is mounted against a wall (160). A cable (162) runs within the channel region (154) of baseboard member (150) to the channel region (156) of baseboard member (152).

The embodiments shown in FIGS. 13–14 had only one cable within the channel region for purposes of clarity. The embodiments shown in FIGS. 13–14 allow multiple cables and wires to be run within the channel regions.

While the embodiments shown in FIGS. 13–14 used baseboards with a miter cut of 45° to form a continuous channel region around right angle corners of a room, other embodiments could use different angle miter cuts to form a continuous channel region around non-right angle corners.

While the embodiments shown in FIGS. 13–14 utilized two sections of the baseboard to form a continuous channel region around a corner in a room, other embodiments could have a single baseboard segment formed as one piece to form a continuous channel region around a corner.

Figure 15:
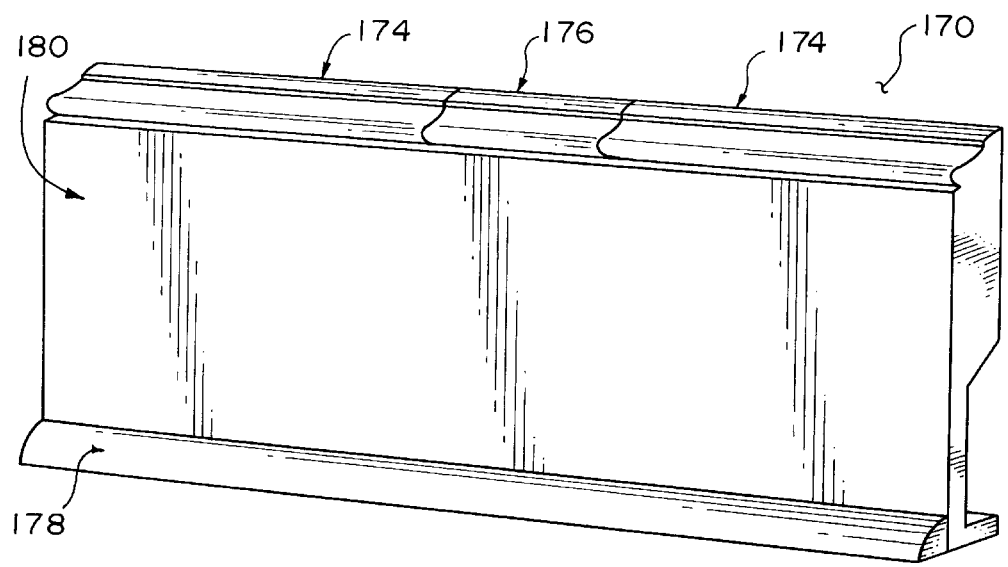
FIG. 15 is a perspective view of a baseboard member with the ICA cap installed, wherein the top of the baseboard member and the ICA cap have a molded shape and a toe-piece is installed in accordance with the present invention.

FIG. 15 is a perspective view of the baseboard member (170) with the ICA cap (176) installed, wherein the top (174) of the baseboard member (170) has a molded shape. The ICA cap (176) is matched to baseboard member (170) such that the ICA cap appears as part of an integrated top when installed. The molded top (174) can be formed by molding the baseboard member (174) or by routing the baseboard member (170) having a differently shaped top. As can be seen from the baseboard member (170) shown in FIG. 15, the present invention has the versatility to allow wiring for power, communications, information and entertainment to be routed within an existing structure in an aesthetically pleasing and unobtrusive manner. The baseboard member (170) may be shaped or contoured to match or enhance the architectural and design style used within the structure. This is particularly useful in residences where the owner or renter of the space may have particular styles of baseboard within the structure. The baseboard system described herein allows customization of the baseboard to the particular needs and preferences of the person or people who will occupy the space in which the baseboard is installed. Additionally, a toe-piece (178) can be attached to the front surface (180) of the baseboard member (170).

Figure 16:
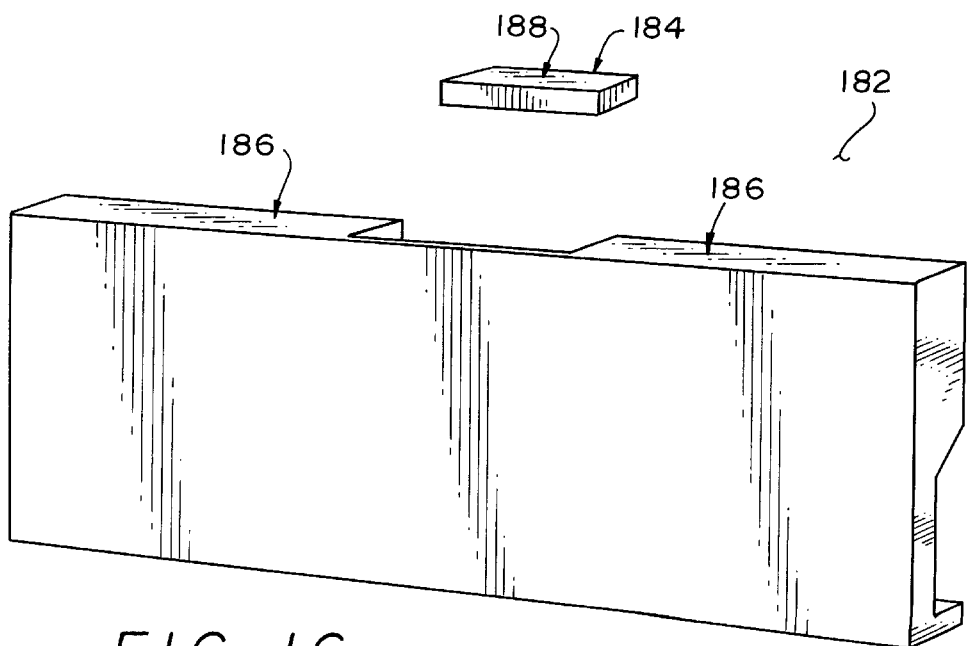
FIG. 16 is a front perspective view of the baseboard member and the ICA cap having flat upper surfaces adapted to mounting a piece of molding thereon, in accordance with the present invention.

FIG. 16 shows another embodiment of the present invention where the baseboard member (182) and the ICA cap (184) have flat upper surfaces (186) and (188), respectively. By providing a flat upper surface to the ICA cap (184) and the baseboard member (182), this particular embodiment allows installers to customize the baseboard infrastructure system to a particular architectural style. Molding of a particular style or shape can be nailed, screwed or glued to the flat upper surfaces (186) and (188).

While the above embodiments utilized an ICA cap held onto the baseboard member by retention pins, as shown in FIG. 5, other embodiments could use other retention means to securely hold the ICA cap when installed in the baseboard member.

Figure 17:
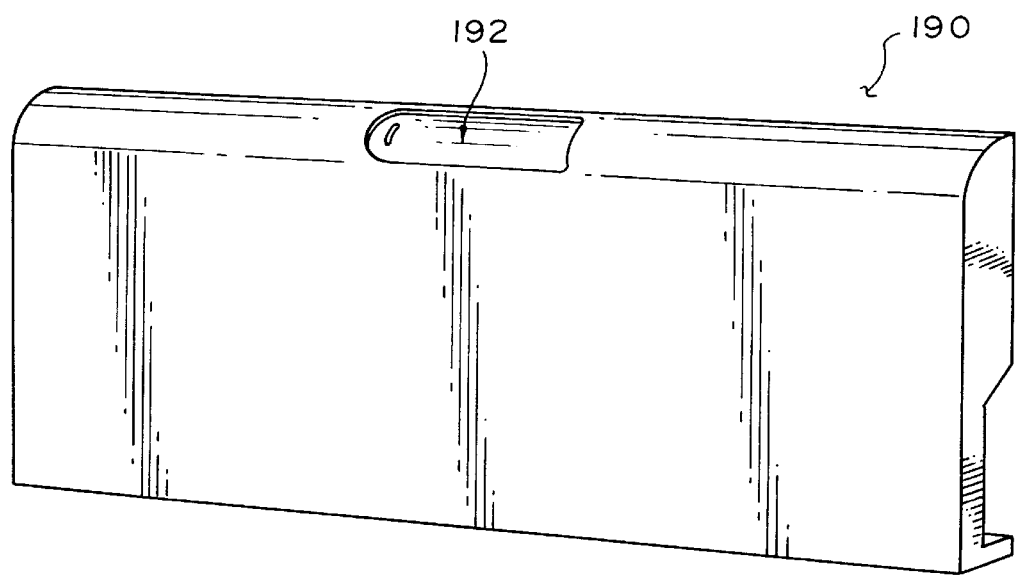
FIG. 17 is the front perspective view of the baseboard member having a sliding ICA cover, shown in the closed position, formed as part of the baseboard member, in accordance with the present invention.

FIG. 17 is a front perspective view of a baseboard member (190) having a sliding ICA cover (192) formed as part of the baseboard member. When no wires or cables are connected to the ICA (not shown), the ICA cover (192) is slid to the closed position to protect the connectors of the ICA from dirt and debris. The ICA cover (192) is shown in the closed position in FIG. 17. When a wire or cable is to be connected to an ICA (194), the ICA cover (192) is slid to the open position shown in FIG. 18.

Figure 18:
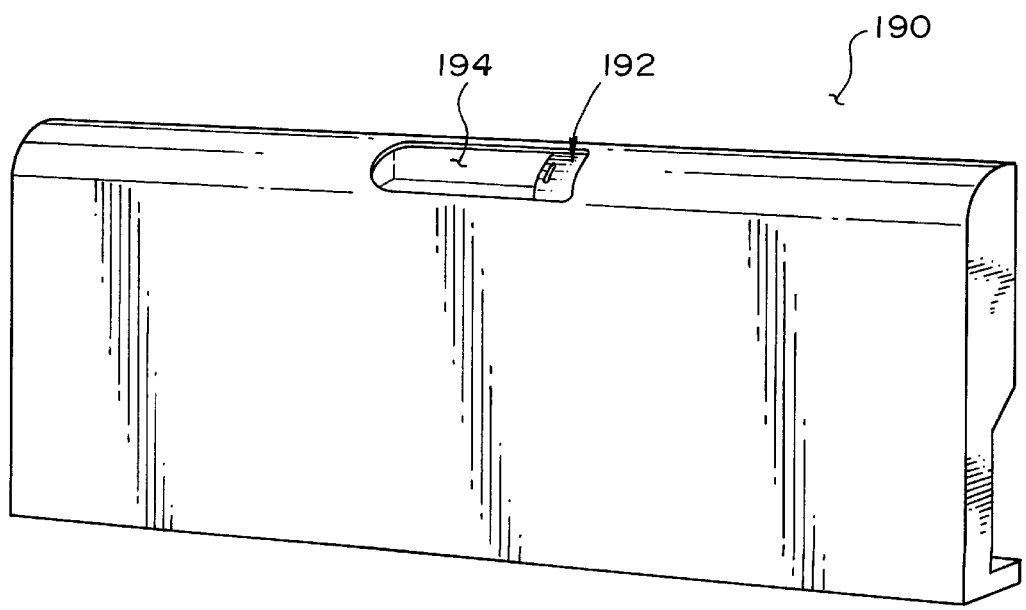
FIG. 18 is a front perspective view of the baseboard member having the sliding ICA cover, shown in the open position, formed as part of the baseboard member, in accordance with the present invention.
Figure 19:
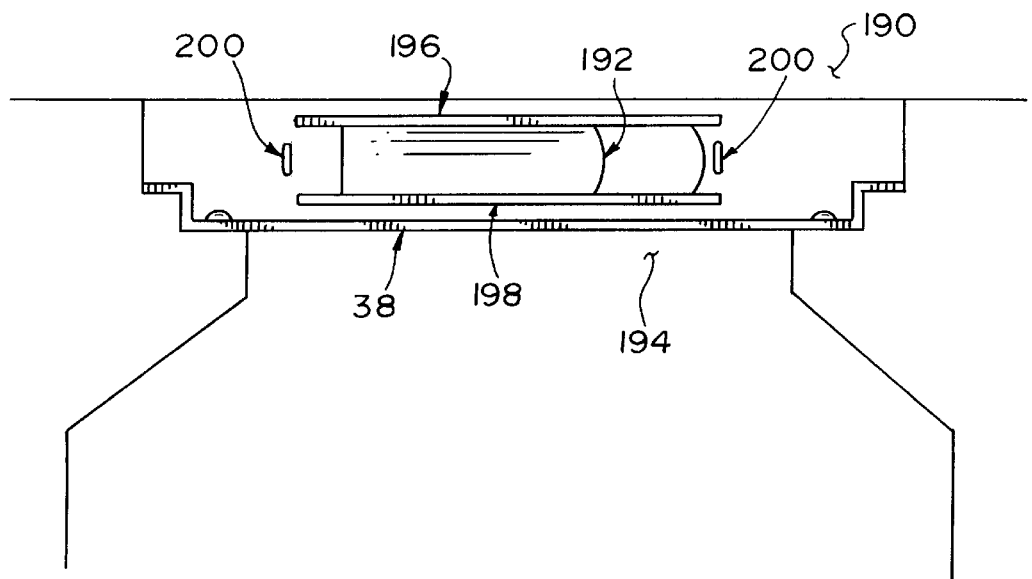
FIG. 19 is a rear view of the ICA showing the sliding ICA cover of the baseboard member shown in FIGS. 17 and 18, in accordance with the present invention.

FIG. 19 is a rear view of the ICA (194) of the baseboard member (190) shown in FIG. 18. The ICA cover (192) slides within cover guides (196) and (198). Cover stops (200) prevent the ICA cover (192) from sliding beyond the open and closed positions. For illustration purposes, the ICA plate (38) is shown without any connectors installed.

Figure 20:
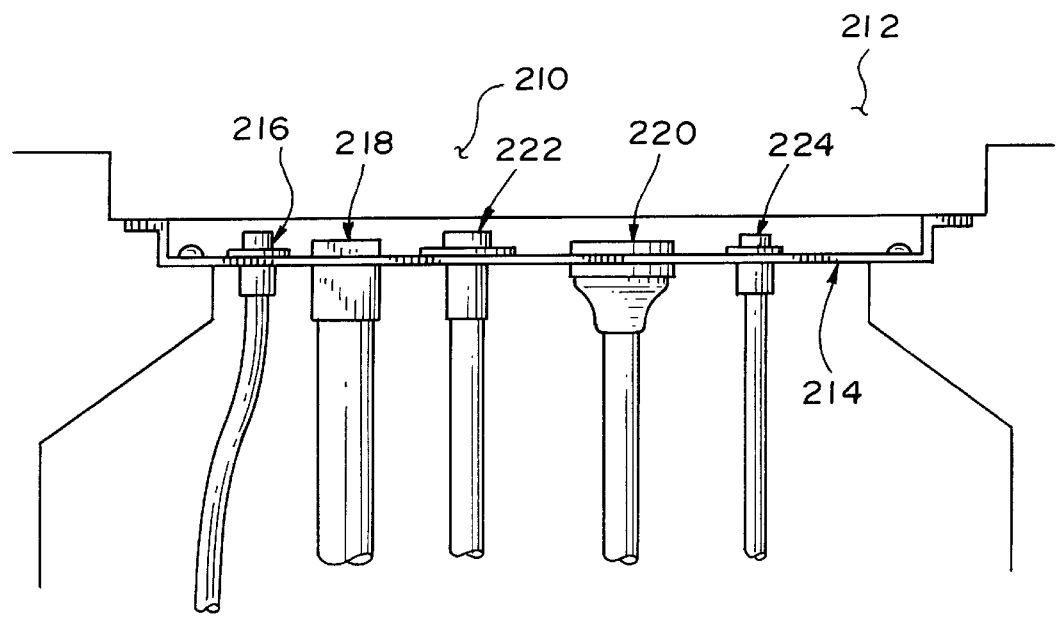
FIG. 20 is a close up rear view of the ICA showing a plurality of different connector types in accordance with the present invention.

FIG. 20 is a close up view of an ICA (210) of a baseboard member (212) as shown in FIGS. 2–4. An ICA plate (214) is adapted to mount fiber-optic connectors (216) and (224), telephone connector (218), AC power connector (220) and AV coaxial connector (222). The ICA (210) can be adapted to carry as many connectors as is appropriate to the application of the baseboard infrastructure system. As this embodiment of the present invention illustrates, the present invention is adaptable to any form of wire, cable, connector or jack that could be utilized within residential or industrial structures. Additionally, the present invention is able to carry an antenna within the channel region of the baseboard member for wireless transmission of data or other signals to devices located within the room wherein the baseboard member is installed. In such an application of the present invention, the antenna could be used to receive data, or to transmit data, or for both reception and transmission of data to the devices within the room. One example of this application is the use of the baseboards to carry antennas used for a local area network (LAN).

While the above embodiments utilized baseboard members with one ICA, other embodiments could have multiple ICAs on one baseboard member.

Figure 21:
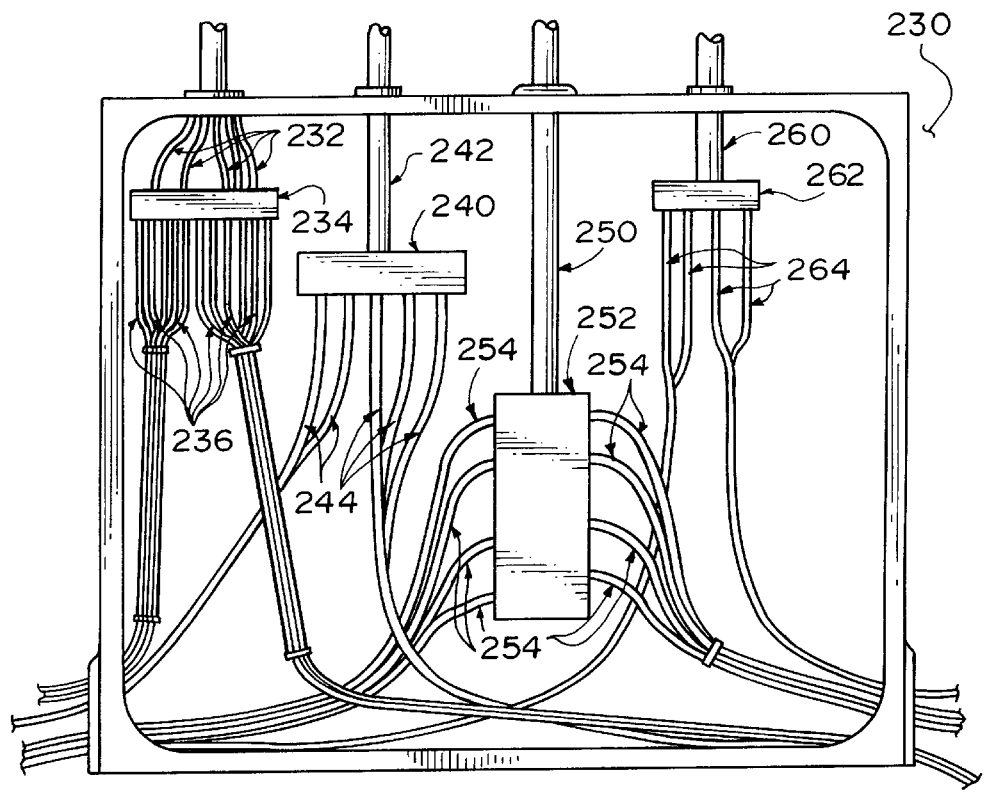
FIG. 21 is a front view of a premise hub showing the splitting of incoming lines into a plurality of lines, in accordance with the present invention.

FIG. 21 is a close up view of a premise hub (230) which acts as a central location for all lines entering a space within a structure, such as an apartment or office. Preferably, the premise hub (230) will be located in a utility closet or other unobtrusive location within the space. Telephone and data lines (232) entering the space are connected to the telephone line divider (234) and split into individual telephone lines (236), which are run through the channel regions of baseboard members (not shown) to connectors located at an ICA (not shown). AC power from the AC power line (242) is brought into the AC power splitter (240) and divided into AC power lines (244). AV cable line (250) entering the apartment connects to an AV divider and amplifier (252). The signal from the AV cable line (250) is amplified and divided into 8 signals by the AV amplifier and divider (252). The 8 signals exiting the AV amplifier and divider (252) are then fed into the 8 AV coaxial lines (254). Fiber-optic line (260) entering the space is connected to an fiber-optic coupler and splitter (262). The signal from the fiber-optic line (260) is coupled and split among the fiber-optic lines (264). All the power lines (244), AV coaxial lines (254) and fiber-optic lines (264) are run through the channel regions of the baseboard members (not shown) of the baseboard infrastructure system to connectors mounted in the ICA of a baseboard member.

Figure 22:
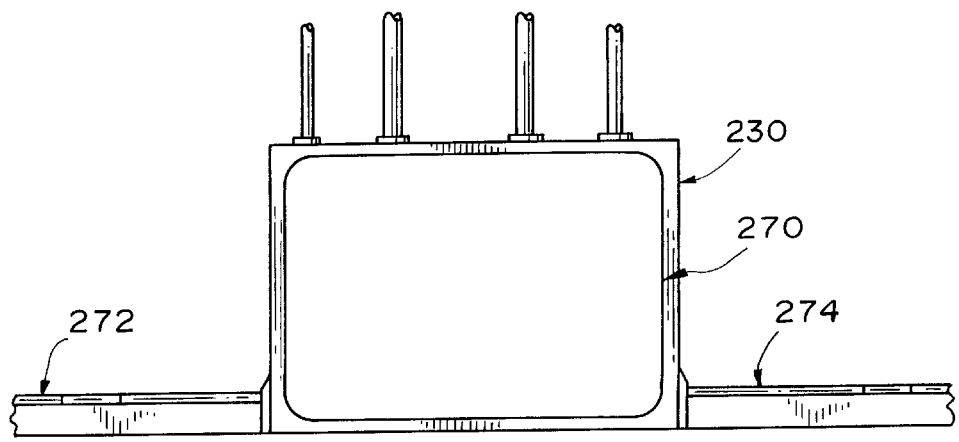
FIG. 22 is a front view of the premise hub with two baseboard members installed to conceal the lines exiting the premise hub, in accordance with the present invention.

FIG. 22 shows a perspective view of the premise hub (230) having a cover (270) to conceal the wires and cables within. Baseboard members (272) and (274) are connected to the premise hub (230). These baseboard members connect to other baseboard members (not shown) and run throughout the apartment to provide connectors via the ICAs to each desired location within the apartment. In this manner an existing space is easily wired for power, telephone, computer and other information services without the need to run cables through walls or under floors. Rewiring an installation is easily accomplished by removing the baseboard members, running the appropriate cables within the channel regions to the baseboard members, and then reinstalling the baseboard members.

While the embodiment of the present invention shown in FIG. 22 utilizes one premise hub, other embodiments could have multiple premise hubs within the structure.

While the embodiments of the baseboard member shown above have a horizontal dimension greater than the height or depth of the baseboard member, other embodiments could have a horizontal dimension shorter than either the height or depth of the baseboard member. Such embodiments are particularly well adapted to fitting an existing space which may require baseboard to be installed along distances of wall only slightly longer than an integer number of standard baseboard members. In such embodiments the baseboard may be formed without a ICA or a connector region, but would still have a channel region to conceal and protect cables or wires run within the baseboard member.

While the embodiments of the present invention described herein were mounted at the base of a wall, the present invention could also be mounted against a wall at a height above the floor. The member could be mounted above the floor against the wall to provide a channel region for running wires and cables to connectors mounted in the ICA of the members. In one possible embodiment, the members a placed at a height to form a chair railing and to carry wires and cables to connectors.

Although the invention has been described in conjunction with particular embodiments, it will be appreciated that various modifications and alterations may be made by those skilled in the art without departing from the spirit and scope of the invention. In particular, those skilled in the art will recognize that the present invention is not limited fiber-optic communications and optical instruments.

What is claimed is:

1. A board assembly comprising:
   a) at least one cable passing through a room defined at least by a floor and a wall; and
   b) a board member comprising:
      1) a bottom surface resting on the floor and a side surface covering and abutting at least a portion of the wall when said board member has been installed in the room;
      2) first and second ends;
      3) a channel region extending adjacent the floor between said first and second ends, said channel region being formed and dimensioned to allow a plurality of said cables to be concealed between said board member and at least the wall;
      4) a top surface remote from said bottom surface;
      5) an exposed surface disposed remote from said side surface;
      6) at least one ICA disposed remotely from said channel region and supporting at least one connector;
      7) at least one connector region extending between and in communication with said ICA and said channel region; and
      8) said one cable passing through said channel region and said connector region to be connected to said one connector.

2. The board assembly as claimed in claim 1, wherein said ICA includes a ICA plate that supports at least said one connector.

3. The board assembly as claimed in claim 2, wherein said ICA plate supports a plurality of connectors.

4. The board assembly as claimed in claim 3, wherein a plurality of the cables pass through said channel region and are connected to corresponding ones of said plurality of connectors.

5. The board assembly as claimed in claim 1, wherein there is further included at least one distinct chamber, which is disposed remote from said bottom surface for receiving and supporting said one ICA.

6. The board assembly as claimed in claim 5, wherein said chamber is in communication with an opening in said top surface.

7. The board assembly as claimed in claim 6, wherein there is further included a cap for covering said opening when said ICA is not in use.

8. The board assembly as claimed in claim 7, wherein said cap is shaped to match said top surface of said board member so that when said cap is closed the existence of said opening is hidden.

9. The board assembly as claimed in claim 8, wherein said board member comprises a first region which extends along and is proximate to the floor, and a second region which extends along and is remote from the floor, said channel region disposed within said first region and said one ICA disposed within said second region.

10. The board assembly as claimed in claim 9, wherein a runner extends along said channel region and is spaced from said bottom surface a distance not less than the distance of the remotest portion of said channel region from said bottom surface to define that portion of said baseboard through which connectors can be disposed to secure said board member to the wall.

11. The board assembly as claimed in claim 9, wherein said one connector region extends between said first and second regions.

12. The board assembly as claimed in claim 11, wherein there is further included at least one chamber disposed entirely in said second region for receiving and supporting said ICA, said connector region having a pair of ends disposed in communication respectively with said chamber and said channel region.

13. The board assembly as claimed in claim 1, wherein said channel region is in open communication with the wall when said bottom surface rests on the floor and said side surface covers a potion of the wall.

14. The board assembly as claimed in claim 1, wherein there is included a second connector region, a second connector, a second ICA, a second cable, said first mentioned and said second connectors are respectively supported by said first mentioned and second ICAs which are respectively associated with said first mentioned and second connector regions, and said first and second cables which are run from said first end respectively to said first and second connectors, said first and second connector regions being spaced from said first end by different distances.

15. The board assembly as claimed in claim 11, wherein said cable has an end, said end of said cable being terminated at and connected to said one connector.

* * * * *